May 17, 1949.　　　　　A. KLOOS　　　　　2,470,404
SHAFT TRUENESS TESTER
Filed May 31, 1944　　　　　　　　　　2 Sheets-Sheet 1
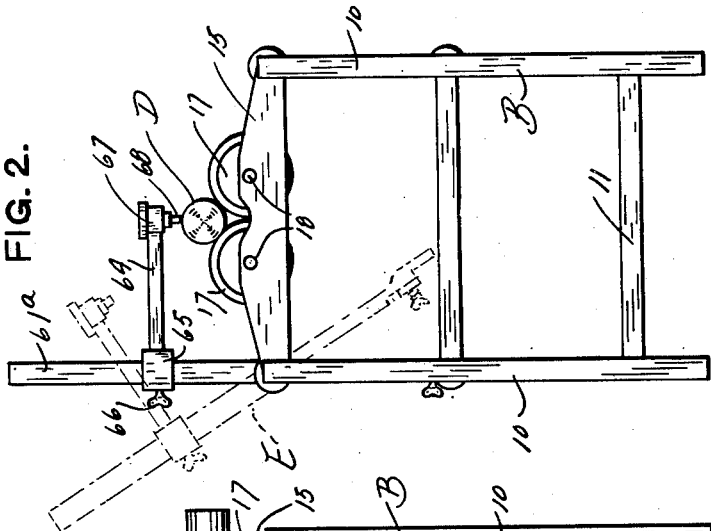
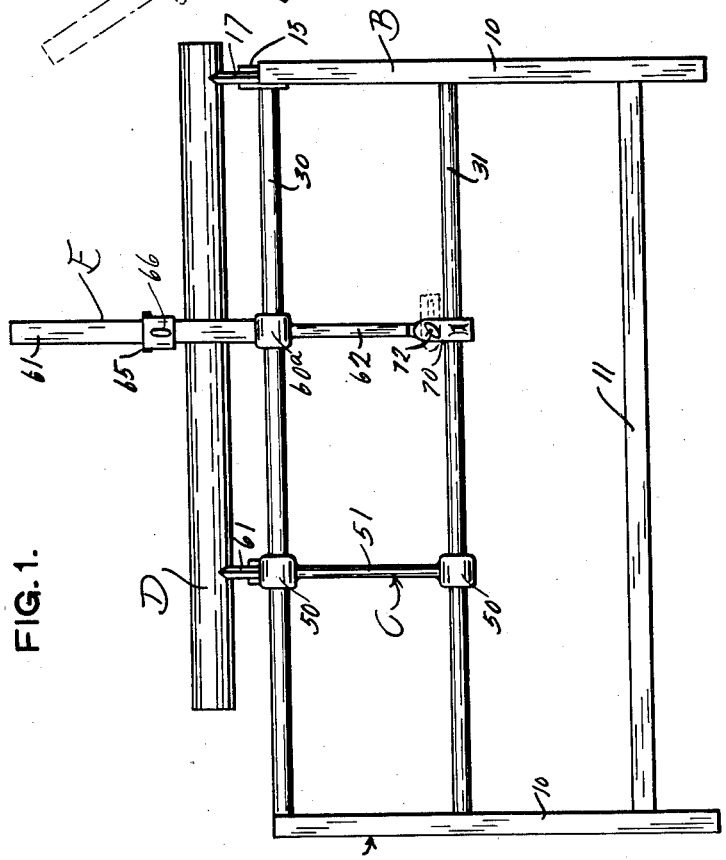
INVENTOR.
Arnold Kloos
BY
ATTORNEYS.

May 17, 1949.  A. KLOOS  2,470,404
SHAFT TRUENESS TESTER
Filed May 31, 1944  2 Sheets-Sheet 2
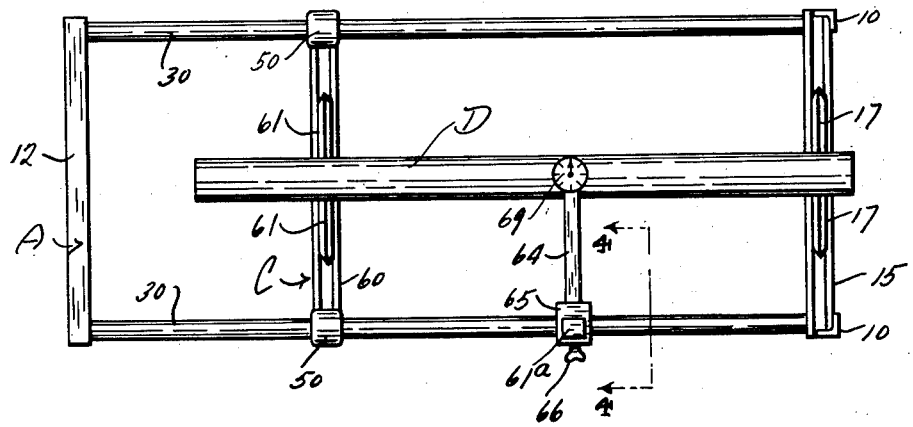
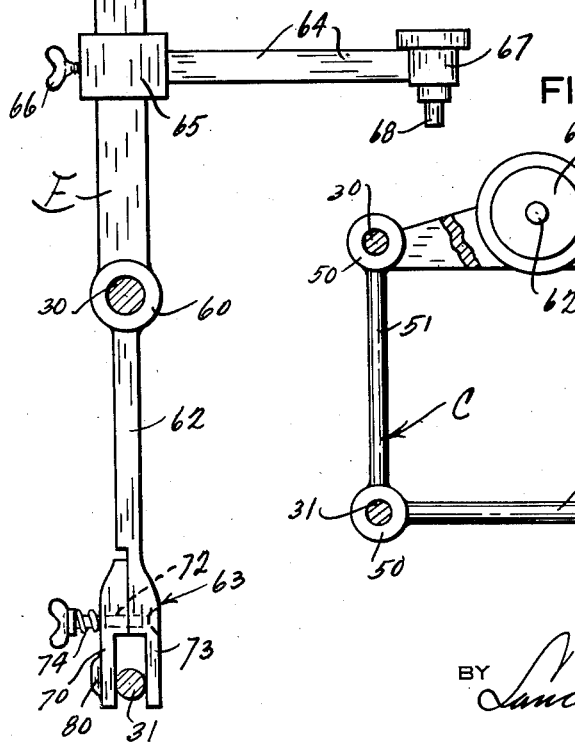
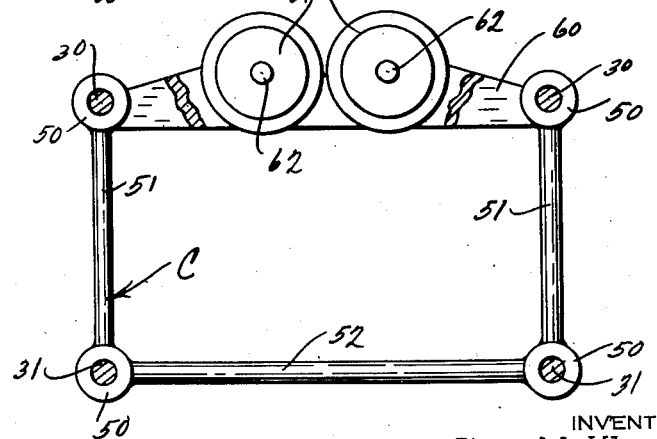
INVENTOR.
Arnold Kloos Patented May 17, 1949

2,470,404

UNITED STATES PATENT OFFICE 2,470,404

SHAFT TRUENESS TESTER

Arnold Kloos, Sharon, Pa.

Application May 31, 1944, Serial No. 538,124

2 Claims. (Cl. 33—174)

This invention relates to improvements in machines for testing the trueness of shafts and other cylindrical-shaped objects.

The primary object of this invention is the provision of an improved testing machine by means of which such objects as valve stems and shafts can be accurately tested in an expeditious manner under such circumstances that any inaccuracies in the trueness thereof, such as bends or other eccentricities, will be immediately detectable.

A further object of this invention is the provision of a testing machine by means of which an operator can test objects such as valve stems and shafts for cylindrical accuracy thruout the length thereof under such circumstances that where a large number of objects are to be tested, of the same size, the machine, due to the arrangement of parts, will enable such testing with facility and without changing the adjustment for which the machine is set.

Other objects and advantages of the invention will be apparent during the course of the following detailed description.

In the accompanying drawings, forming a part of this specification and wherein similar reference characters designate corresponding parts thruout the several views, Figure 1 is a side elevation of the improved machine showing a shaft resting thereon for testing purposes.

Figure 2 is an end elevation of the machine.

Figure 3 is a plan view of the machine.

Figure 4 is an enlarged side view of a gauge and its mounting; the view being taken substantially in the position shown by line 4—4 of Figure 3.

Figure 5 is a fragmentary view showing the details of a movable support of the testing machine upon which an end of the object to be tested rests.

In the drawings, wherein for the purpose of illustration is shown only a preferred embodiment of the invention, the letter A may generally designate the improved testing machine which may consist of a frame B having a slidable supporting portion C associated therewith for supporting objects to be tested, such as a shaft D. Associated with the frame is the improved gauge supporting structure E.

The frame B preferably consists of a table-like structure including vertically positioned supporting legs 10 reinforced at their lower ends by means of horizontal braces 11. At their upper ends the legs 10 at one end of the table have a cross brace 12 (shown in Figure 3) and at opposite end of the frame the legs 10 are connected together by means of a double brace structure 15 serving to support a pair of object supporting rollers 17 rotatably supported thereon by means of pins 18. The rollers 17 are preferably of disc-shaped formation and they may have chisel edged peripheries to form a line contact for effective support of the object to be tested. The legs 10 at the ends of the frame are connected at their upper ends by horizontal circular bars or members 30 and similar bars or members 31 are provided in a connected relation with the legs 10 intermediate the ends thereof; the bars 30 and 31 of course are parallel, and are preferably of circular cross section. These bars 30 and 31 form a means for slidable support of the object supporting frame C. All of the connections of the legs 10, bars and braces above mentioned are preferably integral, as by casting or welding, so as to form a very strong and non-flexible frame which will not admit of any inaccuracies in testing the object.

The supporting frame C preferably consists of sleeves 50 slidably mounted upon the four horizontal bars 30 and 31 and connected together by vertical struts 51, and a horizontal connecting bar 52 for the lower sleeves which ride upon the bars 31. The upper sleeves 50 are connected by means of a double brace construction 60 which supports object supporting rollers 61 upon pins 62. These rollers 61 have chisel edges and they are of the same size as the rollers 17 above described. The supporting rollers upon the slidable frame B have the same dimensional relation as the rollers 17 and they are in such position that the object may be supported in true horizontal position upon the peripheral edges of the rollers 17 and 61, for testing purposes. They are arranged to support the object on the longitudinal center line of the frame B, as is obvious from Figure 3 of the drawings. It is, of course, apparent that the frame C may be slid back and forth to support an end of the object D; the purpose being to adapt the machine for testing objects of different lengths.

Referring to the gauge supporting construction E, the same includes a sleeve 60ª pivotally and slidably mounted upon one of the top bars 30 of the frame B. Rigid with the sleeve 60ª is an upstanding post 61ª and a depending position stabilizing post 62 having a yoke structure 63 at the lower end thereof adapted to engage the lower bar 31, as shown in Figure 4, to accurately position the post 61ª so that it cannot accidently rock upon the shaft 30 during testing the object D. The post 61ᵃ is provided with a gauge supporting arm 64 having a socket member 65 slidably vertical along the post 61ᵃ. It can be clamped thereto in any desired vertical position by means of a thumb screw 66. The arm 64 is, of course, normal to the post 61ᵃ and at its outer end it supports a gauge 67 of any approved type. The gauge 67, as is conventional, has a plunger 68 and a dial and indicator 69 facing upwardly.

In the use of the device the object D is placed upon the rollers 17 and 61. To facilitate this placement, the gauge supporting frame E is pivotally moved upon the post 30 and swung laterally out of the way. To permit this movement the yoke structure 63 plays a part, since one leg 70 of the yoke can be swung in a vertical plane upon a pivot pin 72 which is connected to the other leg 73. On the pivot pin 72 is a spring 74 which normally urges the leg 70 towards the leg 73 for the purpose of gripping the stabilizing bar 31 rather firmly so that there will be no liability of rocking movement of the gauge supporting post 61 during testing operations. It is apparent that the leg 70 may be swung upwardly to clear the bar 31, as by the operator grasping a finger hold 80 upon the leg and then the frame structure E can be rocked upon the bar 30 to move the gauge out of position so the object may be placed upon the rollers.

The yoke structure permits of the facile testing of a large number of the objects D where they are of the same dimensions, since it is not necessary to vary the adjustment of the sleeve supporting arm 64 upon the post 61ᵃ; it only being necessary to swing the leg 70 to clear the bar 31 so that the gauge supporting frame E can be rocked to an out of the way position upon the bar 30. During the testing operation the gauge frame E can be positioned at the desired point and the shaft D supported upon the rollers. The frame E can be slid along the bar 30 to test the proper alignment throughout the length of the object D, as will be quite apparent to those skilled in the art to which this invention relates.

Various changes in the shape, size and arrangement of parts may be made to the form of invention herein shown and described without departing from the spirit of the invention or scope of the claims.

I claim:

1. In a trueness testing machine for shafts and like objects the combination of a frame, means for horizontally positioning the object to be tested upon said frame, said frame including upper and lower horizontal bars, a gauge, an elongated supporting member pivoted intermediate its ends upon the upper bar and slidable therealong in parallelism with an object supported upon said frame, means on the lower end of the supporting member engaging the lower bar to hold a true linear position of the supporting member as it is moved along said upper bar for testing objects, and means mounting said gauge upon the supporting member above its pivot axis.

2. In a trueness testing machine for shafts and like objects the combination of a frame, means for horizontally positioning the object to be tested upon said frame, said frame including upper and lower horizontal bars, a gauge, an elongated supporting member pivoted intermediate its ends upon the upper bar and slidable therealong in parallelism with an object supported upon said frame, means on the lower end of the supporting member engaging the lower bar to hold a true linear position of the supporting member as it is moved along said upper bar for testing objects, an elongated gauge supporting arm, and means supporting said arm upon the upper portion of said supporting member above the pivot axis of the latter including means to clamp the gauge supporting arm in adjusted position along said supporting member above its pivot axis.

ARNOLD KLOOS.

REFERENCES CITED

The following references are of record in the file of this patent:

UNITED STATES PATENTS

| Number | Name | Date |
|---|---|---|
| 1,317,227 | Scusa | Sept. 30, 1919 |
| 1,571,641 | Pratt | Feb. 2, 1926 |
| 1,765,624 | Scusa | June 24, 1930 |
| 1,777,089 | Jansen | Sept. 30, 1930 |
| 1,818,968 | Anderson | Aug. 18, 1931 |
| 2,066,699 | Skelton | Jan. 5, 1937 |
| 2,073,089 | Autenrieth | Mar. 9, 1937 |
| 2,077,277 | Smith | Apr. 13, 1937 |
| 2,148,780 | Seymour | Feb. 28, 1939 |
| 2,258,104 | Seymour | Oct. 7, 1941 |
| 2,353,813 | Duren | July 18, 1944 |

OTHER REFERENCES

Publication, Gages, Gaging and Inspection, D. T. Hamilton, pages 150, 151, published in 1918, The Industrial Press, New York.